US011714180B2

(12) United States Patent
Zhang et al.

(10) Patent No.: US 11,714,180 B2
(45) Date of Patent: Aug. 1, 2023

(54) RADAR SYSTEM TO DETECT ANGLES IN BISTATIC AND MONOSTATIC SCENARIOS

(71) Applicant: Aptiv Technologies Limited, St. Michael (BB)

(72) Inventors: Yu Zhang, Thousand Oaks, CA (US); Zhengzheng Li, Agoura Hills, CA (US); Xin Zhang, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 37 days.

(21) Appl. No.: 17/318,621

(22) Filed: May 12, 2021

(65) Prior Publication Data

US 2022/0244370 A1    Aug. 4, 2022

Related U.S. Application Data

(60) Provisional application No. 63/143,428, filed on Jan. 29, 2021.

(51) Int. Cl.
*G01S 13/44*    (2006.01)
*G01S 13/00*    (2006.01)
*G01S 13/931*    (2020.01)

(52) U.S. Cl.
CPC ........ *G01S 13/4418* (2013.01); *G01S 13/003* (2013.01); *G01S 13/4454* (2013.01); *G01S 13/931* (2013.01)

(58) Field of Classification Search
CPC ............... G01S 13/4418; G01S 13/003; G01S 13/4454; G01S 13/931; G01S 13/42;
(Continued)

(56) References Cited

U.S. PATENT DOCUMENTS 5,657,027 A    8/1997    Guymon
7,474,262 B2   1/2009    Alland
(Continued)

FOREIGN PATENT DOCUMENTS

CN    106772224 A    5/2017
CN    111239678 A    6/2020
(Continued)

OTHER PUBLICATIONS

J. Shi, G. Hu, X. Zhang, F. Sun and H. Zhou, "Sparsity-Based Two-Dimensional DOA Estimation for Coprime Array: From Sum-Difference Coarray Viewpoint," in IEEE Transactions on Signal Processing, vol. 65, No. 21, pp. 5591-5604, Nov. 1, 2017, doi: 10.1109/TSP.2017.2739105. (Year: 2017).*
(Continued)

*Primary Examiner* — Bernarr E Gregory
*Assistant Examiner* — Yonghong Li
(74) *Attorney, Agent, or Firm* — Sawtooth Patent Group PLLC

(57) ABSTRACT

This document describes techniques and systems to enable a radar system to detect angles in bistatic and monostatic scenarios. In some examples, an automotive radar system includes one or more processors. The processors can obtain electromagnetic (EM) energy reflected by objects and generate, based on the reflected EM energy, a two-dimensional (2D) data matrix. The 2D data matrix has a number of rows corresponding to the number of antenna elements in a transmitter array and a number of columns corresponding to the number of antenna elements in a receiver array. Using the 2D data matrix, the processors can determine DoA estimates and DoD estimates in monostatic and bistatic scenarios. By comparing the DoA estimates to the DoD estimates, the processors can determine an angle associated with the objects. In this way, the described techniques and
(Continued)

systems can enable angle detection in monostatic and bistatic conditions with improved angular resolution and reduced cost.

20 Claims, 6 Drawing Sheets

(58) Field of Classification Search
CPC ...... G01S 13/46; G01S 13/462; G01S 13/464; G01S 7/03
See application file for complete search history.

(56) References Cited

U.S. PATENT DOCUMENTS

| | | | |
|---|---|---|---|
| 7,639,171 | B2 | 12/2009 | Alland et al. |
| 9,395,727 | B1 | 7/2016 | Smith et al. |
| 9,869,762 | B1 | 1/2018 | Alland et al. |
| 10,416,680 | B2 | 9/2019 | Li et al. |
| 10,446,923 | B2 | 10/2019 | Watson |
| 10,809,737 | B2 | 10/2020 | Li et al. |
| 10,866,304 | B1 | 12/2020 | Hassibi et al. |
| 11,619,705 | B2 | 4/2023 | Zhang et al. |
| 11,635,506 | B2 | 4/2023 | Iwasa et al. |
| 2017/0029107 | A1* | 2/2017 | Emami ............... G08G 5/0069 |
| 2017/0149147 | A1 | 5/2017 | Minami et al. |
| 2018/0149736 | A1 | 5/2018 | Alland et al. |
| 2019/0285738 | A1 | 9/2019 | Iwasa et al. |
| 2019/0324133 | A1 | 10/2019 | Hong et al. |
| 2020/0004262 | A1 | 1/2020 | Li et al. |
| 2020/0256947 | A1 | 8/2020 | Motoda |
| 2020/0292690 | A1 | 9/2020 | Kim et al. |
| 2020/0309899 | A1 | 10/2020 | Jonas et al. |
| 2020/0355816 | A1* | 11/2020 | Ishikawa ............... G01S 13/34 |
| 2021/0373144 | A1 | 12/2021 | Amani et al. |
| 2022/0163623 | A1 | 5/2022 | Kishigami et al. |

FOREIGN PATENT DOCUMENTS

| | | |
|---|---|---|
| EP | 2662699 A1 | 11/2013 |
| EP | 3757607 A1 | 12/2020 |
| JP | 6523350 B2 | 5/2019 |
| WO | 2021096889 A1 | 5/2021 |

OTHER PUBLICATIONS

H. Jiang, J. -K. Zhang and K. M. Wong, "Joint DOD and DOA Estimation for Bistatic MIMO Radar in Unknown Correlated Noise," in IEEE Transactions on Vehicular Technology, vol. 64, No. 11, pp. 5113-5125, Nov. 2015, doi: 10.1109/TVT.2014.2384495. (Year: 2015).*
J. Yu and J. Krolik, "MIMO adaptive beamforming for nonseparable multipath clutter mitigation," in IEEE Transactions on Aerospace and Electronic Systems, vol. 50, No. 4, pp. 2604-2618, Oct. 2014, doi: 10.1109/TAES.2014.130451. (Year: 2014).*
Chen, et al., "A new method for joint DOD and DOA estimation in bistatic MIMO radar", Feb. 2010, pp. 714-718, 5 pages.
Engels, et al., "Automotive MIMO Radar Angle Estimation in the Presence of Multipath", Oct. 2017, 5 pages.
Haardt, et al., "Unitary ESPRIT: How to Obtain Increased Estimation Accuracy with a Reduced Computational Burden", May 1995, 1232-1242, 11 pages.
Jiang, et al., "Joint DOD and DOA Estimation for Bistatic MIMO Radar in Unknown Correlated Noise", Nov. 2015, 5113-5125, 13 pages.
Jin, "Joint DOD and DOA estimation for bistatic MIMO radar", Feb. 2009, pp. 244-251, 8 pages.
Roy, et al., "ESPRIT-Estimation of Signal Parameters Via Rotational Invariance Techniques", Jul. 1989, pp. 984-995, 12 pages.
Sun, et al., "MIMO Radar for Advanced Driver-Assistance Systems and Autonomous Driving: Advantages and challenges", Jul. 2020, pp. 98-117, 20 pages.

Visentin, et al., "Analysis of Multipath and DOA Detection Using a Fully Polarimetric Automotive Radar", Oct. 2017, 5 pages.
"Extended European Search Report", EP Application No. 21216318.2, May 30, 2022, 10 pages.
Chan, et al., "A parameter estimation approach to estimation of frequencies of sinusoids", Apr. 1981, pp. 214-219.
McGlaning, "Multipath Propagation", Wireless Receiver Design for Digital Communications—Chapter 3., Jan. 2012, pp. 190-206.
Qian, et al., "Enhanced PUMA for direction-of-arrival estimation and its performance analysis", Aug. 15, 2016, pp. 1127-4137.
Scheiner, et al., "Seeing Around Street Corners: Non-Line-of-Sight Detection and Tracking In-the-Wild Using Doppler Radar", Dec. 2019, pp. 2068-2077.
"Extended European Search Report", EP Application No. 21196393.9, dated Feb. 28, 2022, 11 pages.
"Extended European Search Report", EP Application No. 21196394.7, dated Mar. 4, 2022, 11 pages.
"Extended European Search Report", EP Application No. 21215410.8, dated Jul. 12, 2022, 9 pages.
"Extended European Search Report", EP Application No. 21216322.4, Jun. 3, 2022, 9 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
Capon, "High-Resolution Frequency—Wavenumber Spectrum Analysis", Proceedings of the IEEE, vol. 57, No. 8, Aug. 1969, pp. 1408-1418.
Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.
Gu, et al., "Adaptive Beamforming via Sparsity-Based Reconstruction of Covariance Matrix", Compressed Sensing in Radar Signal Processing, 2019, 33 pages.
Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, Feb. 2007, 4 pages.
Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.
Gu, et al., "Robust Adaptive Beamforming Based on Interference Covariance Matrix Sparse Reconstruction", Signal Processing, vol. 96, Mar. 1, 2014, pp. 375-381.
Kikuchi, et al., "Pair-Matching Method for Estimating 2-D Angle of Arrival With a Cross-Correlation Matrix", IEEE Antennas and Wireless Propagation Letters, vol. 5, pp. 35-40, Mar. 2006, 6 pages.
Moffet, "Minimum-Redundancy Linear Arrays", IEEE Transactions on Antennas and Propagation, vol. AP-16, No. 2., Mar. 1968, pp. 172-175.
Pursuant to MPEP § 2001 6(b) the applicant brings the following co-pending application to the Examiner's attention: U.S. Appl. No. 17/075,632.
Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.
Schmidt, "Multiple Emitter Location and Signal Parameter Estimation", IEEE Transactions on Antennas and Propagation, Mar. 1986, pp. 276-280.
Steinwandt, et al., "Performance Analysis of ESPRIT-Type Algorithms for Co-Array Structures", Dec. 10, 2017, 5 pages.
Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.
Vaidyanathan, et al., "Sparse Sensing with Co-Prime Samplers and Arrays", IEEE Trans. Signal Process., vol. 59, No. 2, Feb. 2011, pp. 573-586.
Vaidyanathan, et al., "Theory of Sparse Coprime Sensing in Multiple Dimensions", IEEE Transactions on Signal Processing, vol. 59, No. 8, Aug. 2011, pp. 3592-3608.

(56) References Cited

OTHER PUBLICATIONS

Van Trees, "Planar Arrays and Apertures", Essay in "Detection, Estimation, and Modulation Theory, Optimum Array Processing", pp. 231-274. Wiley-Interscience, May 2002, 44 pages.
Wang, et al., "Two-Dimensional Beamforming Automotive Radar with Orthogonal Linear Arrays", 2019 IEEE Radar Conference, Boston, MA, Apr. 22-26, 2019., 6 pages.
Zhou, et al., "A Robust and Efficient Algorithm for Coprime Array Adaptive Beamforming", IEEE Transactions on Vehicular Technology, vol. 67, No. 2, Feb. 2018, pp. 1099-1112.
Zoltowski, et al., "Closed-Form 2-D Angle Estimation with Rectangular Arrays in Element Space or Beamspace via Unitary ESPRIT", Feb. 1996, pp. 316-328.
Zoltowski, et al., "ESPRIT-Based 2-D Direction Finding with a Sparse Uniform Array of Electromagnetic Vector Sensors", Aug. 1, 2000, pp. 2195-2204.
"Extended European Search Report", EP Application No. 22197753.1, dated Mar. 7, 2023, 17 pages.
Zhang, et al., "Flexible Array Response Control via Oblique Projection", IEEE Transactions on Signal Processing, vol. 67, No. 12, Jun. 15, 2019, pp. 3126-3139.

\* cited by examiner

RADAR SYSTEM TO DETECT ANGLES IN BISTATIC AND MONOSTATIC SCENARIOS

CROSS-REFERENCE TO RELATED APPLICATION

This application claims the benefit under 35 U.S.C. 119(e) of U.S. Provisional Application No. 63/143,428, filed Jan. 29, 2021, the disclosure of which is incorporated by reference in its entirety herein.

BACKGROUND

Radar systems use antennas to transmit and receive electromagnetic (EM) signals for detecting and tracking objects. In automotive applications, radar systems operate in dynamic environments that can cause EM signals to have multipath reflections. A multipath reflection can occur when an EM signal encounters a reflective surface (e.g., a wall, barrier, fence, guardrail, semi-truck, automobile); a multipath reflection causes the direction of departure (DoD) for a transmitted EM signal to differ from the direction of arrival (DoA) for a corresponding reflected EM signal. If the DoD is not equal to the DoA, a multiple-input and multiple-output (MIMO) radar system generally cannot generate a synthetic array, which provides the radar system with a virtual array that has a larger aperture than a corresponding physical array.

SUMMARY

This document describes techniques and systems to enable a radar system to detect angles in bistatic and monostatic scenarios. In some examples, a radar system for installation on a vehicle includes at least one processor. The processor is configured to obtain EM energy reflected by one or more objects in an environment of the vehicle, and generate, based on the reflected EM energy, a two-dimensional (2D) data matrix. The 2D data matrix has a number of rows corresponding to the number of antenna elements in a transmitter array and a number of columns corresponding to the number of antenna elements in a receiver array. Using the 2D data matrix, the processor can determine DoA estimates and DoD estimates for monostatic and bistatic scenarios. By comparing the DoA estimates to the DoD estimates, the processor can determine an angle associated with each object. In this way, the described techniques and systems can enable a radar system to detect angles associated with objects in monostatic and bistatic scenarios with a virtual array providing improved angular resolution and reduced cost.

This document also describes methods performed by the above-summarized system and other configurations of the radar system set forth herein and means for performing these methods.

This Summary introduces simplified concepts related to enabling a radar system to detect angles in bistatic and monostatic scenarios, and are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system to detect angles in bistatic and monostatic scenarios are described in this document with reference to the following figures. The same numbers are often used throughout the drawings to reference like features and components:

FIG. 3-1 illustrates an example antenna with a physical array of antenna elements for a radar system that can detect angles in bistatic and monostatic scenarios;

FIG. 3-2 illustrates an example antenna with a physical array and synthetic array of antenna elements for a radar system that can detect angles in bistatic and monostatic scenarios;

DETAILED DESCRIPTION

Overview

Figure 1:
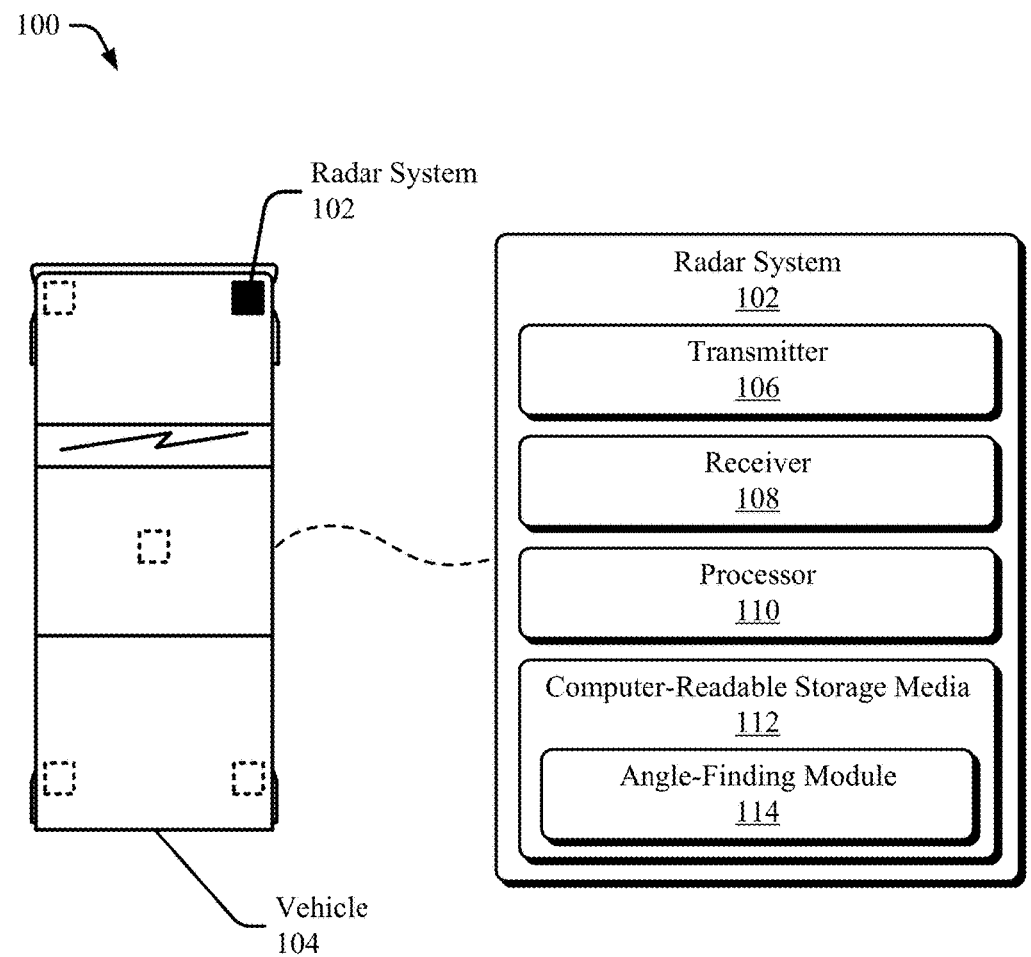
FIG. 1 illustrates an example environment in which a radar system can detect angles in bistatic and monostatic scenarios in accordance with techniques of this disclosure.
Figure 1:
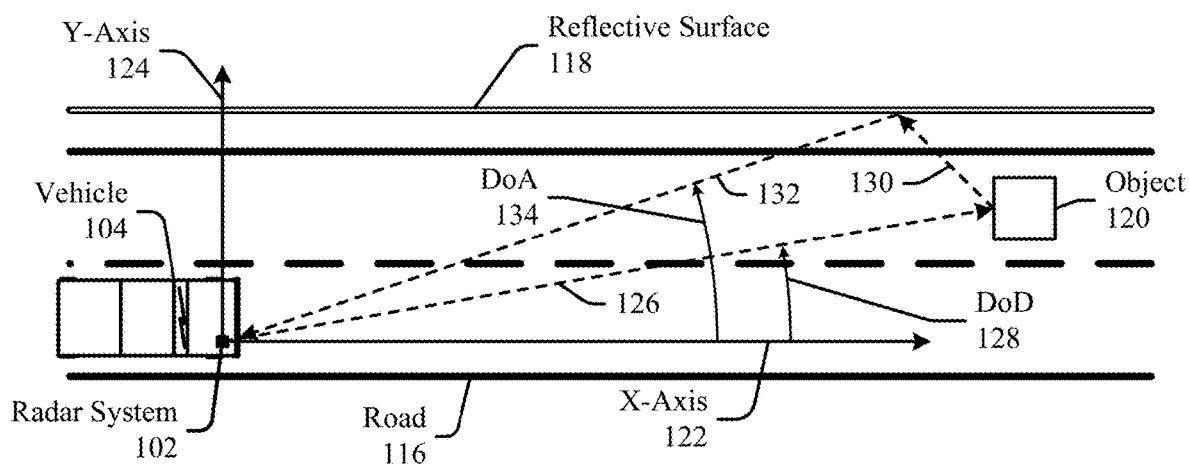

Radar systems can be configured as an important sensing technology that vehicle-based systems use to acquire information about the surrounding environment. For example, vehicle-based systems can use radar systems to detect objects in or near a roadway and, if necessary, take necessary actions (e.g., reduce speed, change lanes) to avoid a collision.

Radar systems generally include at least two antennas to transmit and receive EM radiation. Some automotive radar systems operate multiple-input and multiple-output (MIMO) radars in crowded multipath environments to obtain reliable detections of nearby objects. Multipath reflections can occur when a reflective surface (e.g., a wall, fence, barrier, guardrail, another vehicle) reflects an EM signal. The multipath environment can result in several scenarios, including direct-path reflections, bistatic reflections, and two-way multipath reflections. A direct-path reflection occurs when a transmitted and reflected EM signal travels directly between the radar system and the object. A direct-path scenario provides the shortest distance between a radar system and an object.

In contrast, a bistatic reflection or scenario occurs when a transmission or a reflection takes multiple trajectories or paths to travel between an object and a radar system. Two-way multipath reflections occur when both the transmitted and received EM signal each take multiple paths to travel between the object and the radar system. Like the direct-path scenario, the two-way multipath scenario is monostatic because the DoD is the same as the DoA.

During bistatic scenarios, radar detections often cannot be used as reliable indicators, for example, to detect objects in a radar system field-of-view. A radar reflection has a DoA that is not equal to a corresponding DoD in a bistatic scenario. The mismatch between the DoD and the DoA can violate a necessary condition for some MIMO radar systems to form a synthetic array. In other words, bistatic scenarios can mask the position of the reflecting object, which makes determining a radar range and range rate difficult.

Automotive radar systems often use MIMO radar systems to improve angular resolution. In MIMO, the radar system and/or a processor forms a synthetic uniform linear array (ULA) (also referred to as a "synthetic array") with a larger aperture than a corresponding physical array. For example, a radar system can configure eight physical channels of a radar transceiver (e.g., two transmit channels and six receive channels) using MIMO to provide twelve channels or another number of channels larger than the number of physical channels. With additional channels, a MIMO radar system can operate with an improved angular resolution, relying on a flexible physical layout of inexpensive and possibly fewer hardware components than traditional non-MIMO radar systems.

However, a radar system often can only form a synthetic array using MIMO if the DoD is the same as the DoA. If a bistatic scenario exists, the DoD is not equal to the DoA. As a result, radar detections cannot easily be mapped to a corresponding antenna element of a synthetic array, resulting in errors using MIMO techniques to detect and track objects. The DoD-DoA mismatch can also lead to saturation or overconsumption of computing resources. At best, the saturation may merely delay a radar system output; at worst, the output includes errors from incorrectly mapping a surrounding environment, which can cause an automotive system or an operator of a vehicle to drive in an unsafe manner, for example, by driving too closely to objects that are not accurately tracked, or operating the vehicle too gingerly by leaving an exaggerated buffer between the vehicle and the objects.

Some radar systems address bistatic scenarios using polarimetric antennas, constrained spacing among antenna elements, and/or multiple data snapshots. For example, some radar systems use polarimetric antennas to analyze bistatic scenarios. Often, these systems can accurately distinguish monostatic scenarios from bistatic scenarios only if the target is known. These systems also rely on more-expensive polarimetric antennas. Other radar systems can only distinguish bistatic scenarios from monostatic scenarios using multiple data snapshots (e.g., more than one hundred snapshots) and an antenna spacing of half the transmitted wavelength (e.g., $0.5\lambda$) for both the transmitter and receiver array. Because automotive radar systems generate a single snapshot while a vehicle moves, such systems are generally inapplicable to automotive applications. These systems also require a relatively large number of antenna elements to improve angular resolution.

In contrast, this document describes techniques and systems to provide a radar system that can detect angles in bistatic and monostatic scenarios. For example, a radar system can include a transmitter array and a receiver array. The transmitter array includes a first number of antenna elements. The receiver array includes a second number of antenna elements. The antenna elements of both the transmitter and receiver arrays can be uniformly spaced apart by a first and second distance, respectively. The radar system can determine DoA estimates and DoD estimates using a two-dimensional (2D) data matrix with the first number of rows and the second number of columns. The radar system can then determine the angle associated with a detected object by comparing the DOA estimates to the DOD estimates. In this way, the described systems and techniques can utilize MIMO techniques to reduce the number of antenna elements while preserving the angular resolution that can otherwise be achieved using a synthetic array. The radar system can be used in automotive radar applications as a low-cost and computationally efficient solution without aliasing and only requiring a single snapshot.

This example is just one example of the described techniques and systems of a radar system that can detect angles in bistatic and monostatic scenarios. This document describes other examples and implementations.

OPERATING ENVIRONMENT

FIG. 1 illustrates an example environment 100 in which a radar system 102 can detect angles in bistatic and monostatic scenarios in accordance with techniques of this disclosure. In the depicted environment 100, the radar system 102 is mounted to, or integrated within, a vehicle 104 traveling on a road 116. Within a field-of-view, the radar system 102 can detect one or more objects 120 near or surrounding the vehicle 104. The radar system 102 emits radar signals with a direction-of-departure (DoD) 128 and expects to receive corresponding radar reflections with a direction-of-arrival (DoA) 134.

The radar system 102 can detect one or more objects 120 in the vicinity of the vehicle 104. Although illustrated as a passenger truck, the vehicle 104 can represent other types of motorized vehicles (e.g., a car, an automobile, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the object 120. The radar system 102 can detect the object 120 from any exterior surface of the vehicle 104. For example, vehicle manufacturers can integrate the radar system 102 into a bumper, side mirror, headlights, rear lights, or any other interior or exterior location where the object 120 requires detection. In some cases, the vehicle 104 includes multiple radar systems 102, such as a first radar system 102 and a second radar system 102, that provide a larger instrument field-of-view. In general, vehicle manufacturers can design the locations of the one or more radar systems 102 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The object 120 is composed of one or more materials that reflect radar signals. Depending on the application, the object 120 can represent a target of interest. In some cases, the object 120 can be a moving object (e.g., another vehicle) or a stationary object (e.g., a roadside sign, road barrier, debris). Depending on the application, the object 120 can represent a target of interest from which the vehicle 104 can safely navigate the road 116.

The radar system 102 emits EM radiation by transmitting EM signals or waveforms via antenna elements. In the environment 100, the radar system 102 can detect and track the object 120 by transmitting and receiving one or more radar signals. For example, the radar system 102 can transmit EM signals between one hundred and four hundred gigahertz (GHz), between four and one hundred GHz, or between approximately seventy and eighty GHz.

The radar system 102 can be a MIMO radar system and rely on ULAs to match the reflected EM signals to corresponding objects. The radar system 102 can also operate as a traditional radar system that does not rely on dynamic MIMO techniques. The radar system 102 can include a transmitter 106 to transmit EM signals. The radar system 102 can also include a receiver 108 to receive reflected versions of the EM signals. The transmitter 106 includes one or more components, including an antenna or antenna elements, for emitting the EM signals. The receiver 108 includes one or more components, including an antenna or antenna elements, for detecting the reflected EM signals. The transmitter 106 and the receiver 108 can be incorporated together on the same integrated circuit (e.g., a transceiver integrated circuit) or separately on different integrated circuits. In other implementations, the radar system 102 does not include a separate antenna, but the transmitter 106 and the receiver 108 each include one or more antenna elements.

The radar system 102 also includes one or more processors 110 (e.g., an energy processing unit) and computer-readable storage media (CRM) 112. The processor 110 can be a microprocessor or a system-on-chip. The processor 110 can execute instructions stored in the CRM 112. For example, the processor 110 can process EM energy received by the receiver 108 and determine, using an angle-finding module 114, a location of the object 120 relative to the radar system 102. The processor 110 can also detect various features (e.g., range, target angle, range rate, velocity) of the object 120. The processor 110 can also generate radar data for at least one automotive system. For example, the processor 110 can control, based on processed EM energy from the receiver 108, an autonomous or semi-autonomous driving system of the vehicle 104.

The angle-finding module 114 obtains EM energy received by the receiver 108 and determines angles associated with the object 120. The radar system 102 can implement the angle-finding module 114 as instructions in the CRM 112, hardware, software, or a combination thereof executed by the processor 110.

The radar system 102 can determine a distance to the object 120 based on the time it takes for the EM signals to travel from the radar system 102 to the object 120, and from the object 120 back to the radar system 102. The radar system 102 can also determine, using the angle-finding module 114, a location of the object 120 in terms of a direction of departure (DoD) 128 and a direction of arrival (DoA) 134 based on the direction of one or more large-amplitude echo signal received by the radar system 102.

As an example environment, FIG. 1 illustrates the vehicle 104 traveling on a road 116. A reflective surface 118 is near or in the road 116. The reflective surface 118 can be a wall, guardrail, fence, building, or another vehicle. The radar system 102 detects the object 120 in front of the vehicle 104. The radar system 102 can define a coordinate system with an x-axis 122 (e.g., in a forward direction along the road 116) and a y-axis 124 (e.g., perpendicular to the x-axis 122 and along a surface of the road 116). The transmitter 106 of the radar system 102 can transmit an EM signal 126 in front of the vehicle 104. The object 120 can reflect the transmitted EM signal 126 as reflected EM signal 130. The reflected EM signal 130 can travel directly back to the radar system 102 or be reflected by the reflective surface 118 as a reflected EM signal 132.

The reflected EM signal 132 can be received by the receiver 108 of the radar system 102. The angle-finding module 114 of the radar system 102 can locate the object 120 in terms of the DoD 128 and the DoA 134. The DoD 128 and the DoA 134 can represent a horizontal angle from the x-axis 122 to the object 120. In the depicted scenario, the DoD 128 is not equal to the DoA 134, and a bistatic scenario exists. In other scenarios, the transmitted EM signal 126 is reflected directly back to the radar system 102 (e.g., a direct-path reflection), and the DoD 128 is approximately equal to the DoA 134. In yet other scenarios, the transmitted EM signal 126 is reflected by the reflective surface 118 and then reflected by the object 120. The reflected EM signal 130 is then reflected by the reflective surface 118 before being received by the radar system 102. In this two-way multipath reflection, the DoD 128 is approximately equal to the DoA 134.

The vehicle 104 can also include at least one automotive system that relies on data from the radar system 102, such as a driver-assistance system, an autonomous-driving system, or a semi-autonomous-driving system. The radar system 102 can include an interface to an automotive system that relies on the data. For example, the processor 110 outputs, via the interface, a signal based on EM energy received by the receiver 108.

Generally, the automotive systems use radar data provided by the radar system 102 to perform a function. For example, the driver-assistance system can provide blind-spot monitoring and generate an alert that indicates a potential collision with the object 120 that is detected by the radar system 102. The radar data from the radar system 102 indicates when it is safe or unsafe to change lanes in such an implementation. The autonomous-driving system may move the vehicle 104 to a particular location on the road 116 while avoiding collisions with the object 120 detected by the radar system 102. The radar data provided by the radar system 102 can provide information about a distance to and the location of the object 120 to enable the autonomous-driving system to perform emergency braking, perform a lane change, or adjust the speed of the vehicle 104.

Figure 2:
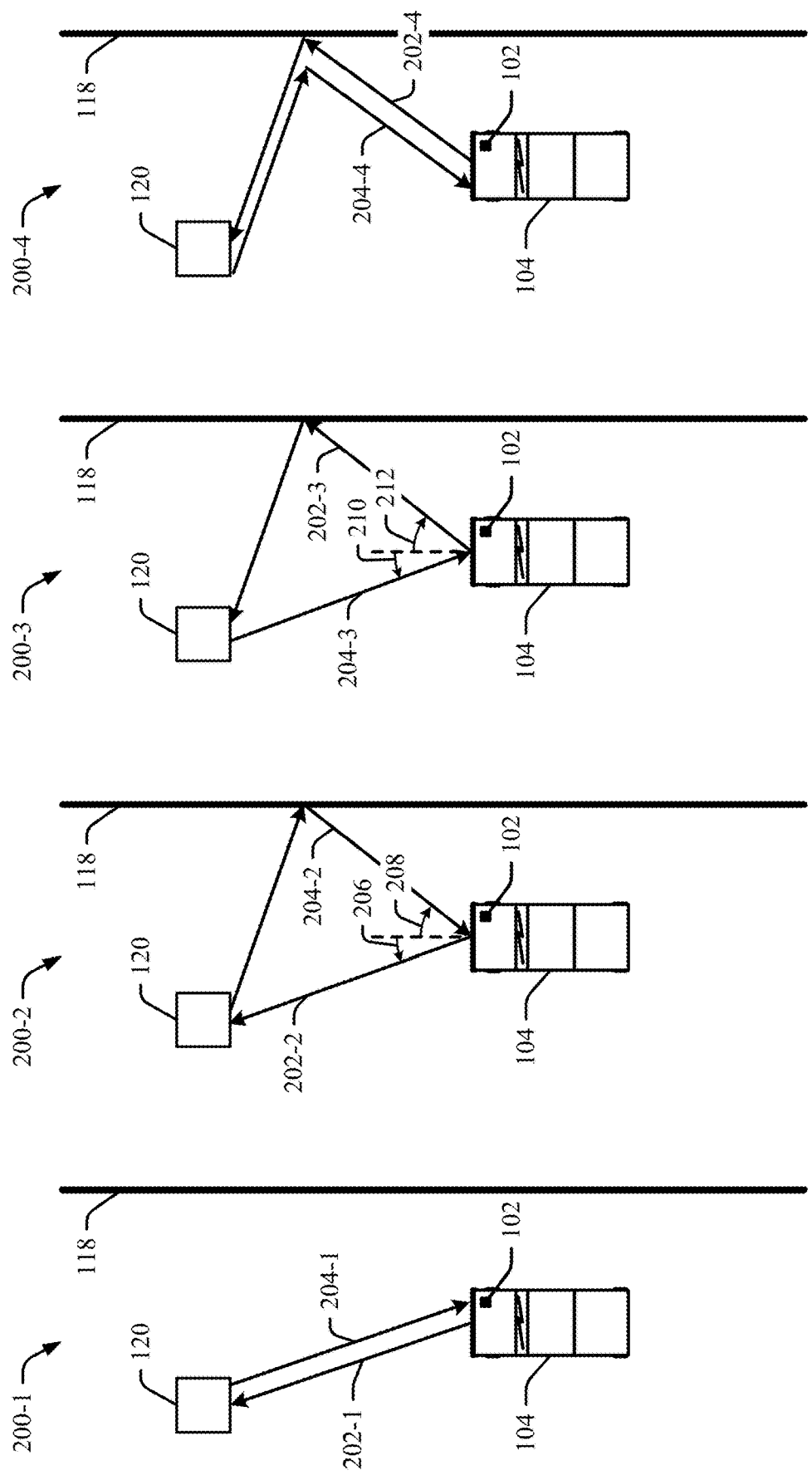
FIG. 2 illustrates different detection conditions encountered by a vehicle with a radar system that can detect angles in bistatic and monostatic scenarios in accordance with techniques of this disclosure.

FIG. 2 illustrates different detection conditions 200-1, 200-2, 200-3, and 200-4 encountered by vehicle 104 with the radar system 102 that can detect angles in bistatic and monostatic scenarios in accordance with techniques of this disclosure. The one or more objects 120 can be at different positions relative to the vehicle 104. On the right side of vehicle 104, a reflective surface 118 (e.g., a guardrail, a railing, a construction zone boundary, a fence, another vehicle) exists. The radar system 102 detects one or more objects 120 by emitting radiation with a DoD 202-1, a DoD 202-2, a DoD 202-3, or a DoD 202-4, and receiving a reflected signal with a DoA 204-1, a DoA 204-2, a DoA 204-3, or a DoA 204-4.

In the detection condition 200-1, a monostatic scenario exists for a direct-path transmission and reflection of the radar signal. The radar system 102 transmits the emitted radiation or radar signal in the DoD 202-1. The corresponding reflected radiation or return radar signal is reflected by the object 120 to vehicle 104 in the DoA 204-1. The angle-finding module 114 may determine that the DoA 204-1 and the DoD 202-1 are equal, and therefore, no bistatic scenario exists in front of vehicle 104. The range or length of the transmitted radiation is equal to the range or length of the reflected radiation. The total range or length of the propagation path is also the shortest possible.

In the detection condition 200-2, a bistatic scenario exists for a direct-path transmission and a multipath reflection of the radar signal. The radar system 102 transmits the emitted radiation or radar signal in the DoD 202-2. The corresponding reflected radiation or return radar signal is reflected by the object 120 and the reflective surface 118 to the vehicle 104 in the DoA 204-2. The angle-finding module 114 may determine that the DoA 204-2 and the DoD 202-2 are not equal, and therefore, a bistatic scenario exists in front of vehicle 104. The range or length of the transmitted radiation is not equal to the range or length of the reflected radiation.

In the detection condition 200-3, a bistatic scenario exists for a multipath transmission and a direct-path reflection of the radar signal. The radar system 102 transmits the emitted radiation or radar signal in the DoD 202-2 toward the reflective surface 118. The corresponding reflected radiation or return radar signal is reflected by the object 120 to vehicle 104 in the DoA 204-3. The angle-finding module 114 may determine that the DoA 204-3 and the DoD 202-3 are not equal, and therefore, a bistatic scenario exists in front of vehicle 104. The range or length of the transmitted radiation is not equal to the range or length of the reflected radiation. The radar signal of the bistatic scenarios in the detection conditions 200-2 and 200-3 travel the same path but in opposite directions. The total range or length of the propagation path is equal in both bistatic scenarios. The total range for the detection conditions 200-2 and 200-3 are longer than the entire range for the detection condition 200-1 but smaller than that for the detection condition 200-4.

In the detection condition 200-4, a monostatic scenario exists for a multipath transmission and reflection of the radar signal. The radar system 102 transmits the emitted radiation or radar signal in the DoD 202-4 toward the reflective surface 118. The corresponding reflected radiation or return radar signal is reflected by the object 120 and the reflective surface 118 to the vehicle 104 in the DoA 204-4. The angle-finding module 114 may determine that the DoA 204-4 and the DoD 202-4 are equal, and therefore, no bistatic scenario exists in front of vehicle 104. The range or length of the transmitted radiation is equal to the range or length of the reflected radiation. The total range or length of the propagation path is the longest possible among the detection conditions 200-1 through 200-4.

The described radar system 102 and angle-finding module 114 can perform object detection for one or more objects 120 in the detection conditions 200-1 through 200-4. Doppler velocity estimates for a multipath reflection can depend on the speed of the vehicle 104 (e.g., the host vehicle), the speed of the object 120, and the speed of the reflective surface 118. For example, when the reflective surface 118 is stationary (e.g., a wall, a fence, a guardrail), the direct-path detection condition 200-1 has the largest absolute Doppler velocity, while the two-way multipath detection condition 200-4 has the smallest absolute Doppler velocity. The bistatic scenarios in the detection conditions 200-2 and 200-3 have the same Doppler velocity with an absolute value between those of the detection conditions 200-1 and 200-4. As another example, if the reflective surface 118 moves (e.g., a moving vehicle), Doppler velocity estimates for the detection conditions 200-2 and 200-3 are the same.

The angle-finding module 114 can find three clusters of energy in range-Doppler detections (RDDs), including direct-path detections, bistatic scenarios, and two-way multipath detections. The angle-finding module 114 can use range-Doppler information to differentiate the bistatic scenarios (e.g., detection conditions 200-2 and 200-3) from the monostatic scenarios (e.g., detection conditions 200-1 and 200-4). The bistatic scenarios fall into the same range-Doppler bin.

After range-Doppler processing, the angle-finding module 114 can solve the following two scenarios by considering up to three angular targets in the same range-Doppler bin. First, a monostatic scenario where the DoD (e.g., the DoD 202-1 and the DoD 202-4) and the DoA (e.g., the DoA 204-1 and the DoA 204-4) are equal. In this scenario, the angle-finding module 114 can estimate the DoA without aliasing by forming a large synthetic array. Second, a bistatic scenario where the DoD (e.g., the DoD 202-2 and the DoD 202-3) and the DoA (e.g., the DoA 204-2 and the DoA 204-3) are not equal. In this scenario, the angle-finding module 114 can estimate the DoD and the DoA without aliasing. There are two angular targets in the same range-Doppler bin in the bistatic scenario that share the same propagation path with opposite directions. For the detection condition 200-2, the DoD 202-2 is a first angle 206, $\theta_1$, and the DoA 204-2 is a second angle 208, $\varphi_1$. For the detection condition 200-3, the DoD 202-3 is a third angle 212, $\theta_2$, and the DoA 204-3 is a fourth angle 210, $\varphi_2$. Because the propagation paths are the same, the first angle 206, $\theta_1$, is equal to the fourth angle 210, $\varphi_2$, and the second angle 208, $\varphi_1$, is equal to third angle 212, $\theta_2$.

Figures 1, 3:
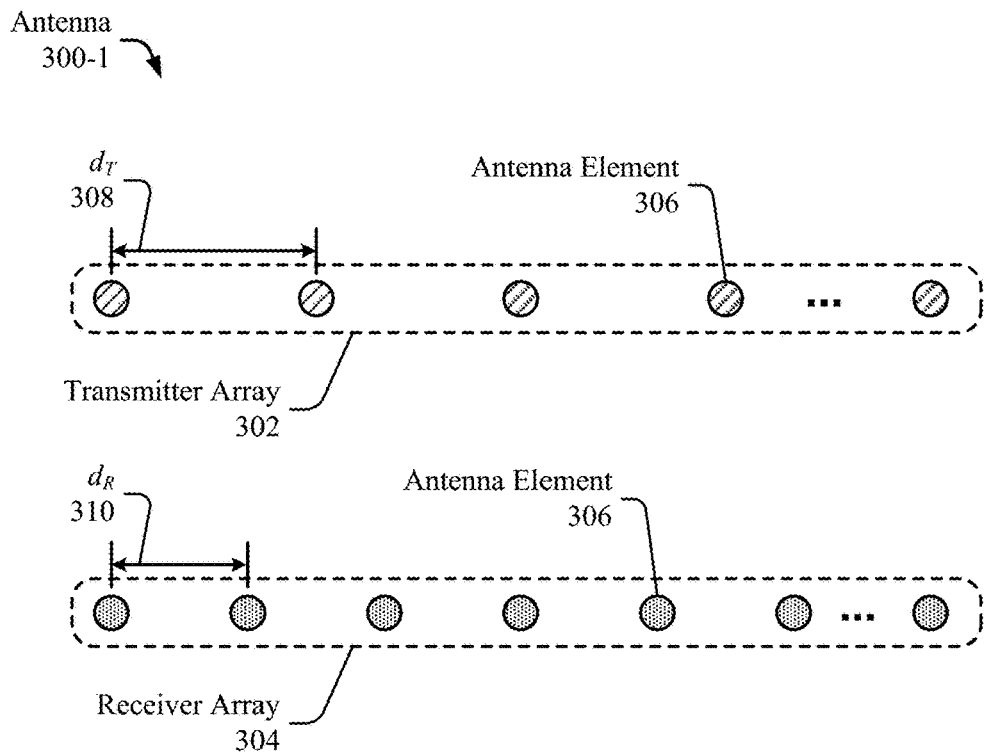
Figures 2, 3:
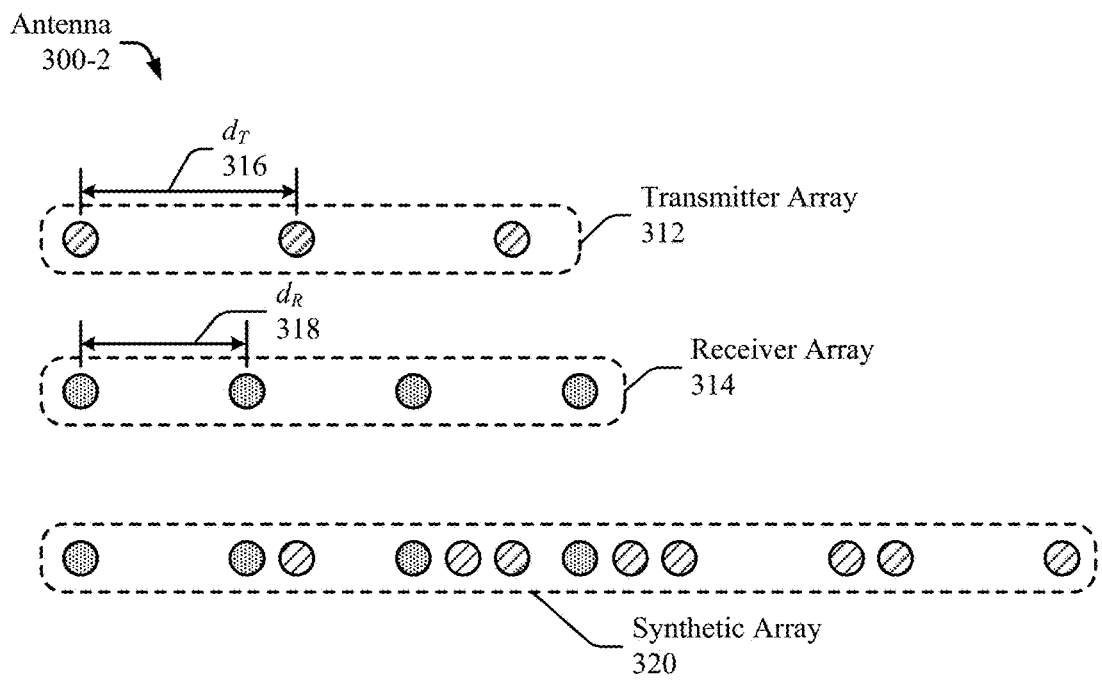

FIG. 3-1 illustrates an example antenna 300-1 with a physical array of antenna elements 306 for a radar system that can detect angles in bistatic and monostatic scenarios. For example, the radar system can be the radar system 102 of FIGS. 1 and 2. In the depicted implementation, the antenna 300-1 includes a transmitter array 302 and a receiver array 304 that can correspond to the transmitter 106 and the receiver 108, respectively, of FIG. 1.

The transmitter array 302 is a uniform linear array (ULA) that includes $N_T$ antenna elements 306 with a transmitter spacing, $d_T$, 308. In the depicted implementation, the transmitter array 302 includes five antenna elements 306 (e.g., $N_T$ is equal to five). The transmitter array 302 can also include additional or fewer antenna elements 306 in other implementations.

The receiver array 304 is also a ULA that includes $N_R$ antenna elements 306 with a receiver spacing, $d_R$, 310. In the depicted implementation, the receiver array 304 includes seven antenna elements 306 (e.g., $N_R$ is equal to seven). The receiver array 304 can also include additional or fewer antenna elements 306 in other implementations.

The transmitter spacing, $d_T$, 308 and the receiver spacing, $d_R$, 310 can be multiples of 0.5λ, where λ is the wavelength of the transmitted EM radiation. The transmitter spacing 308 and the receiver spacing 310 can be represented using Equations (1) and (2):

$$d_T = m_T \times 0.5\lambda \quad (1)$$

$$d_R = m_R \times 0.5\lambda \quad (2)$$

where $m_T \in \mathbb{Z}^+$ and $m_R \in \mathbb{Z}^+$. For the described radar system, $m_T$ and $m_R$ satisfy either of the following requirements for de-aliasing: (1) $m_T$ or $m_R$ is equal to one; or (2) $m_T$ and $m_R$ are coprime (e.g., $m_T$ and $m_R$ do not have common factors other than one).

The antenna 300-1 supports a MIMO radar system and can rely on the ULAs of the transmitter array 302 and the receiver array 304 to match the radar returns to the corresponding signals. In other implementations, the radar system can operate as a traditional radar system that does not rely on dynamic MIMO techniques.

In the depicted implementations, the transmitter array 302 and the receiver array 304 are positioned in an azimuth direction. In other implementations, the transmitter array 302 and the receiver array 304 can be positioned in an elevation direction or another direction.

The transmitter array 302 and the receiver array 304 can be planar arrays that provide high gain and low loss. Planar arrays are well-suited for vehicle integration due to their small size. For example, the antenna elements 306 can be slots etched or otherwise formed in a plating material of one PCB surface for a substrate-integrated waveguide (SIW) antenna. The antenna elements 306 can also be part of an aperture antenna, a microstrip antenna, or a dipole antenna. For example, transmitter array 302 and receiver array 304 can include subarrays of patch elements (e.g., microstrip patch antenna subarrays) or dipole elements.

FIG. 3-2 illustrates another example antenna 300-2 with a physical array and synthetic array of antenna elements for a radar system that can detect angles in bistatic and monostatic scenarios. For example, the radar system can be the radar system 102 of FIGS. 1 and 2. In the depicted implementation, the antenna 300-2 includes a transmitter array 312 and a receiver array 314 that can correspond to the transmitter 106 and the receiver 108, respectively, of FIG. 1.

In the depicted implementation, the transmitter array 312 includes three antenna elements 306 (e.g., $N_T$ is equal to three) with a transmitter spacing, $d_T$, 316 equal to 2.0λ. The receiver array 314 includes four antenna elements 306 (e.g., $N_R$ is equal to four) with a receiver spacing, $d_R$, 318 equal to 1.5λ. For the transmitter array 312 and the receiver array 314, $m_T$ and $m_R$ are equal to four and three. The radar system can generate a synthetic array 320 with a minimum spacing of the antenna elements 306 equal to 0.5λ, allowing angle estimation by the angle-finding module 114 covering −90 degrees to 90 degrees.

The synthetic array 320 includes $N_T N_R$ antenna elements 306. In the depicted implementation, the synthetic array 320 includes 12 antenna elements 306 (e.g., four×three). The antenna elements 306 of the synthetic array 320 are spaced apart by 1.5λ, 1.0λ, or 0.5λ.

Figure 4:
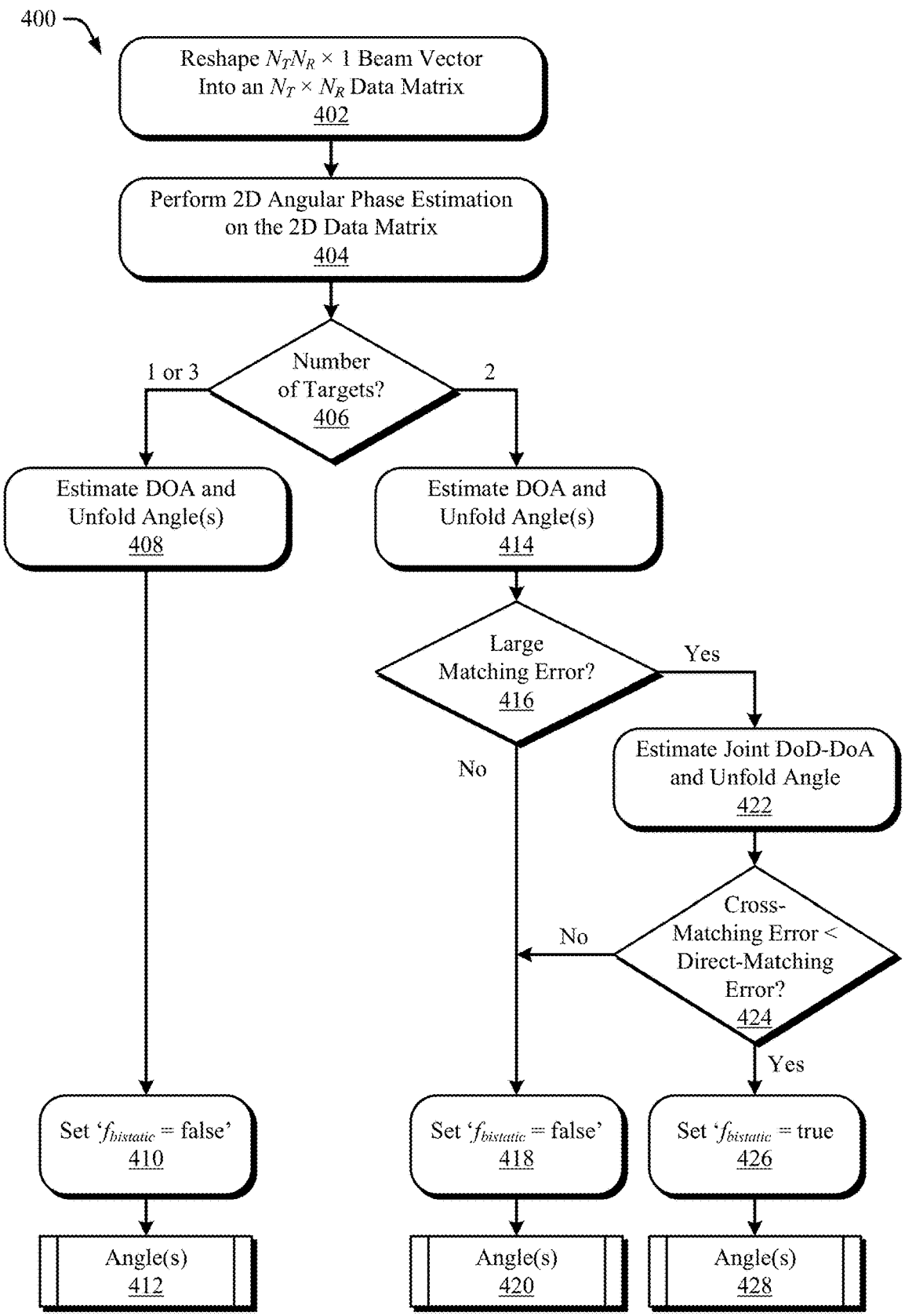
FIG. 4 illustrates an example flowchart of the described techniques and systems for detecting angles in bistatic and monostatic scenarios.

FIG. 4 illustrates an example flowchart 400 of the described techniques and systems for detecting angles in bistatic and monostatic scenarios. The radar system of FIG. 4 can, for example, be the radar system 102 of FIG. 1, which includes the angle-finding module 114. The radar system 102 includes the transmitter array 302 with $N_T$ antenna elements 306 spaced apart by the transmitter spacing, $d_T$, 308. The radar system 102 also includes the receiver array 304 with $N_R$ antenna elements 306 spaced apart by the receiver spacing, $d_R$, 310. The total number of channels in the radar data includes $N_T N_R$ channels.

Figure 5:
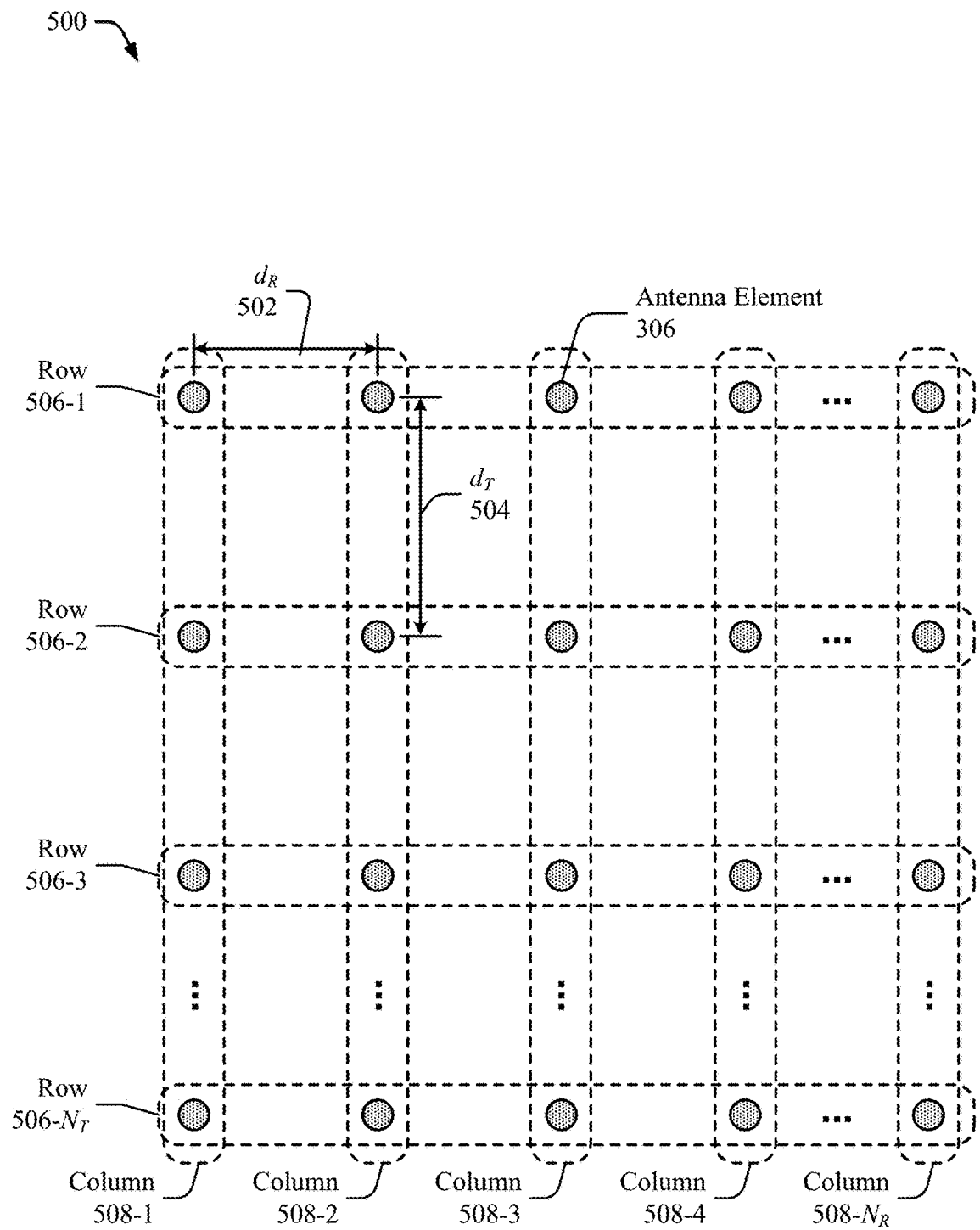
FIG. 5 illustrates an example 2D data matrix generated by the described radar system to detect angles in bistatic and monostatic scenarios.

At 402, the angle-finding module 114 reshapes the beam vector of the radar data into a 2D data matrix (e.g., the 2D data matrix 500 of FIG. 5). In particular, angle-finding module 114 or processor 110 receives the radar data as an $N_T N_R \times$one beam vector. The angle-finding module 114 reshapes this beam vector into an $N_T \times N_R$ data matrix. The angle-finding module 114 can use the horizontal dimension of the 2D data matrix to measure the DoA angular phase using a ULA with the receiver spacing, $d_R$, 310. The angle-finding module 114 can also use the vertical dimension of the 2D data matrix to measure the DoD angular phase using a ULA with the transmitter spacing, $d_t$, 308.

At 404, the angle-finding module 114 performs 2D angular phase estimation on the 2D data matrix to estimate the DoD phase and the DoA phase. The angle-finding module 114 can perform the angular phase estimation using at least one of a 2D unitary Estimation of Signal Parameters via Rotational Invariance Technique (ESPRIT), a 2D Multiple Signal Classification (MUSIC), or a two-dimensional fast Fourier transform (FFT) beamforming based-function. The angle-finding module 114 can use other 2D angular phase estimation methods as well. The DoD angular phase can be represented as μ and the DoA angular phase as v. If the radar system 102 detects multiple angular targets, the angle-finding module 114 can represent the joint DoD and DoA phase estimates of the ith target as ($\mu_i$, $v_i$), where $-\pi \le \mu_i \le \pi$ and $-\pi \le v_i \le \pi$. In some implementations, the angle-finding module 114 limits the number of angular targets considered within the same range-Doppler bin to three, so i=1, 2, or 3.

The angle-finding module 114 can represent the DoD as θ and the DoA as φ. For the ith target, the mathematical relationship between its DoD, $\theta_i$, and DoD phase, $\mu_i$, can be represented by Equation (3):

$$\mu_i + 2k\pi = \frac{2\pi d_T \sin\theta_i}{\lambda}, \text{ where } k \in \mathbb{Z} \tag{3}$$

The mathematical relationship between its DoA, $\varphi_i$, and DoD phase, $v_i$, can be represented by Equation (4):

$$v_i + 2k\pi = \frac{2\pi d_R \sin\varphi_i}{\lambda}, \text{ where } k \in \mathbb{Z} \tag{4}$$

For the DoD estimation, the angle-finding module 114 estimates the angle using the transmitter spacing 308, $d_T$. Consider that the transmitter spacing 308 is equal to $m_T \times 0.5\lambda$. If $m_T$ is equal to one, the angle estimation can cover −90° to 90° without aliasing. The transmitter spacing can be larger than 0.5λ to improve the angular resolution. In such a case, the DoD estimation θ can include several possible angles. The angle-finding module 114 can estimate the angular phase μ and then calculate the angle θ using Equation (5):

$$\theta = \sin^{-1}\frac{(\mu + 2k\pi)\lambda}{2\pi d_T}, \text{ where } k \in \mathbb{Z} \text{ and } d_T = m_T \times 0.5\lambda \tag{5}$$

When $m_T$ is equal to one, there is one solution for θ between −90° to 90°. When $m_T$ is greater than or equal to two, there are $m_t$ candidate solutions for θ between −90° to 90°.

The angle-finding module 114 can similarly determine the DoA estimate. For the DoA estimation, the angle-finding module 114 estimates the angle using the receiver spacing, $d_R$. Consider that the receiver spacing is equal to $m_R \times 0.5\lambda$. The receiver spacing can also be larger than 0.5λ to improve the angular resolution. In such a case, the DoA estimation φ can include several possible angles. The angle-finding module 114 can estimate the angular phase v and then calculate the angle φ using Equation (6):

$$\varphi = \sin^{-1}\frac{(v + 2k\pi)\lambda}{2\pi d_R}, \text{ where } k \in \mathbb{Z} \text{ and } d_R = m_R \times 0.5\lambda \tag{6}$$

Because $m_R$ is generally greater than or equal to two, there are $m_R$ candidate solutions for φ between −90° to 90°.

The angle-finding module 114 can combine the information for the DoA phase estimation and the DoD phase estimation to perform de-aliasing (e.g., angle unfolding). The angle-finding process can, however, depend on the number of detected objects.

At 406, the angle-finding module 114 determines the number of targets or objects. For example, the angle-finding module can estimate the number of objects using the Akaike Information Criterion (AIC) and the Minimum Description Length (MDL).

At 408, if the angle-finding module 114 estimates the number of targets as one or three, a monostatic scenario exists (e.g., the detection condition 200-1 or 200-4 of FIG.

2), and the angle-finding module 114 estimates the DoA and unfolds the angle estimates 412. At 410, the angle-finding module 114 can set a bistatic flag or indicator, $f_{bistatic}$, to false. In the monostatic scenario, the DoD, $\theta$, is approximately equal to the DoA, $\varphi$. For the ith 2D angular phase estimation ($\mu_i$, $v_i$), the $\mu_i$ and $v_i$ are phase estimates from the same angle but measured by different antenna spacing (e.g., the transmitter spacing $d_T$ and the receiver spacing $d_R$).

The angle-finding module 114 performs angle unfolding by comparing the possible ambiguous estimates based on $d_T$ and $d_R$. Using Equation (5) on the angle-finding module 114 unfolds $\theta_i$ to $m_T$ intervals, resulting in $m_T$ candidate angles $[\theta_i^{(1)}, \theta_i^{(2)}, \ldots, \theta_i^{(m_T)}]$ between $-90°$ to $90°$. Using Equation (6) on $v_i$, the angle-finding module 114 unfolds $\varphi_i$ to $m_R$ intervals, resulting in $m_R$ candidate angles $[\varphi_i^{(1)}, \varphi_i^{(2)}, \ldots, \varphi_i^{(m_R)}]$ between $-90°$ to $90°$. In this scenario, the angle-finding module 114 finds the match or overlap between the set $[\theta_i^{(1)}, \theta_i^{(2)}, \ldots, \theta_i^{(m_T)}]$ and $[\varphi_i^{(1)}, \varphi_i^{(2)}, \ldots, \varphi_i^{(m_R)}]$ which represents the angle 412 of the ith angular target or object without aliasing. The angle-finding module 114 can also consider noise and measurement variation to determine the closest match between the two sets of candidate angles and determine the angle 412. The matching error can indicate the accuracy of the angle 412.

The angle-finding module 114 can repeat operation 408 for each angular detection if the number of objects is equal to three.

At 414, if the angle-finding module 114 estimates the number of objects as two, a monostatic scenario or a bistatic scenario can exist. In this scenario, the angle-finding module 114 estimates the DoA and unfolds the angle estimates 420 and 428 under both potential scenarios. The angle-finding module 114 can then use the matching error from both angle estimates 420 and 428 to determine which scenario applies.

For the monostatic-scenario hypothesis, the DoD, $\theta$, is equal to the DoA, $\varphi$. For the two 2D angular phase estimates ($\mu_1$, $v_1$) and ($\mu_2$, $v_2$), the angle-finding module 114 can use the DoA estimation process described with respect to operation 408 for the monostatic scenario and record the respective matching errors.

For the bistatic-scenario hypothesis, the angle-finding module 114 considers the bistatic geometry for the two 2D angular phase estimations ($\mu_1$, $v_1$) and ($\mu_2$, $v_2$). Consider that $\mu_1$ and $v_2$ are phase estimates from the angle $\alpha$ (e.g., the angle 206 or the angle 210 from the detection condition 200-2 or 200-3, respectively). The phase estimates $\mu_1$ and $v_2$ are measured by the antenna spacing $d_T$ and $d_R$, respectively. Also, consider that $\mu_2$ and $v_1$ are phase estimates from the angle $\beta$ (e.g., the angle 212 or the angle 208 from the detection condition 200-2 or 200-3, respectively). The phase estimates $\mu_2$ and $v_1$ are measured by antenna spacing $d_T$ and $d_R$, respectively. For each pair of phase estimates, the angle-finding module 114 can perform angle unfolding by comparing the possible ambiguous angle estimates from $d_T$ and $d_R$.

For the pair $\mu_1$ and $v_2$, the angle-finding module 114 can use Equation (5) on and unfold $\theta_1$ to $m_T$ intervals, resulting in $m_T$ candidate angles $[\theta_1^{(1)}, \theta_1^{(2)}, \ldots, \theta_1^{(m_T)}]$ between $-90°$ to $90°$. The angle-finding module 114 can use Equation (6) on $v_2$ and unfold $\varphi_2$ to $m_R$ intervals, resulting in $m_R$ candidate angles $[\varphi_2^{(1)}, \varphi_2^{(2)}, \ldots, \varphi_2^{(m_R)}]$ between $-90°$ to $90°$. The angle-finding module 114 can find the closest match between the set $[\theta_1^{(1)}, \theta_1^{(2)}, \ldots, \theta_1^{(m_T)}]$ and the set $[\varphi_2^{(1)}, \varphi_2^{(2)}, \ldots, \varphi_2^{(m_R)}]$ as the estimate of the angle $\alpha$ without aliasing. The angle-finding module 114 also determines the matching error for this estimate.

For the pair $\mu_2$ and $v_1$, the angle-finding module 114 can use Equation (5) on $\mu_2$ and unfold $\theta_2$ to $m_T$ intervals, resulting in $m_T$ candidate angles $[\theta_2^{(1)}, \theta_2^{(2)}, \ldots, \theta_2^{(m_T)}]$ between $-90°$ to $90°$. The angle-finding module 114 can use Equation (6) on $v_1$ and unfold $\varphi_1$ to $m_R$ intervals, resulting in $m_R$ candidate angles $[\varphi_1^{(1)}, \varphi_1^{(2)}, \ldots, \varphi_1^{(m_R)}]$ between $-90°$ to $90°$. The angle-finding module 114 can find the closest match between the set $[\theta_2^{(1)}, \theta_2^{(2)}, \ldots, \theta_2^{(m_T)}]$ and $[\varphi_1^{(1)}, \varphi_1^{(2)}, \ldots, \varphi_1^{(m_R)}]$ as the estimate of the angle $\beta$ without aliasing. The angle-finding module 114 also determines the matching error for this estimate.

At 416, the angle-finding module 114 compares the matching errors for the bistatic-condition hypothesis to a predetermined threshold. If the matching error is smaller than the predetermined threshold, the angle-finding module 114 at 418 sets the bistatic flag or indicator, $f_{bistatic}$, to false. And the angle estimates 420 are output from the monostatic-scenario hypothesis.

If the matching error is larger than the predetermined threshold, the angle-finding module 114 at 422 performs cross-matching to estimate the joint DoD and DoA and unfold the angles. In cross-matching, the angle-finding module 114 uses $\mu_1$ and $v_2$ as one pair for unfolding, while $\mu_2$ and $v_1$ are used as one pair for unfolding using Equations (5) and (6).

At 424, if the matching error of the cross-matching is smaller than the matching error obtained from direct-matching, the angle-finding module 114 sets the bistatic flag or indicator, $f_{bistatic}$, to true at operation 426 and outputs the unfolding results from this cross-matching as angle estimates 428. Otherwise, the angle-finding module 114 outputs the unfolding results from the direct-matching operation.

In another implementation, the angle-finding module 114 compares the matching errors between the monostatic-scenario hypothesis and the bistatic-scenario hypothesis. The smaller matching error indicates the true hypothesis and corresponding angle estimates.

The described techniques and systems of the angle-finding module 114 allow the radar system 102 to determine angles in bistatic and monostatic scenarios. The angle estimates corresponding to the one or more objects 120 can be determined without aliasing and with a single data snapshot. In addition, the radar system 102 can use sparse transmitter and receiver arrays (e.g., spacing of antenna elements greater than $0.5\lambda$) to increase the aperture of the arrays without additional antenna elements.

FIG. 5 illustrates an example 2D data matrix 500 generated by the described radar system to detect angles in bistatic and monostatic scenarios. The data matrix 500 can be generated as part of operation 402 of the angle-finding module 114 as described with respect to FIG. 4.

Consider that radar system 102 includes $N_T$ antenna elements 306 in a transmitter array and $N_R$ antenna elements 306 in a receiver array. The radar system 102 then includes $N_T N_R$ channels. Generally, radar system 102 receives the radar data as low-level, time-series data obtained from a MIMO antenna array to generate the synthetic array. The angle-finding module 114 can reshape the radar data into the 2D data matrix 500.

In the 2D data matrix 500, the radar data of the ith row 506 is data from the ith transmitter antenna element. For example, the first row 506-1 is data from the first transmitter antenna element. Mathematically, the horizontal dimension of the 2D data matrix 500 measures the DoA angular phase using a ULA with an antenna spacing, $d_R$, 502, and the vertical dimension measures the DoD angular phase using a ULA with an antenna spacing, $d_T$, 504.

Example Method

Figure 6:
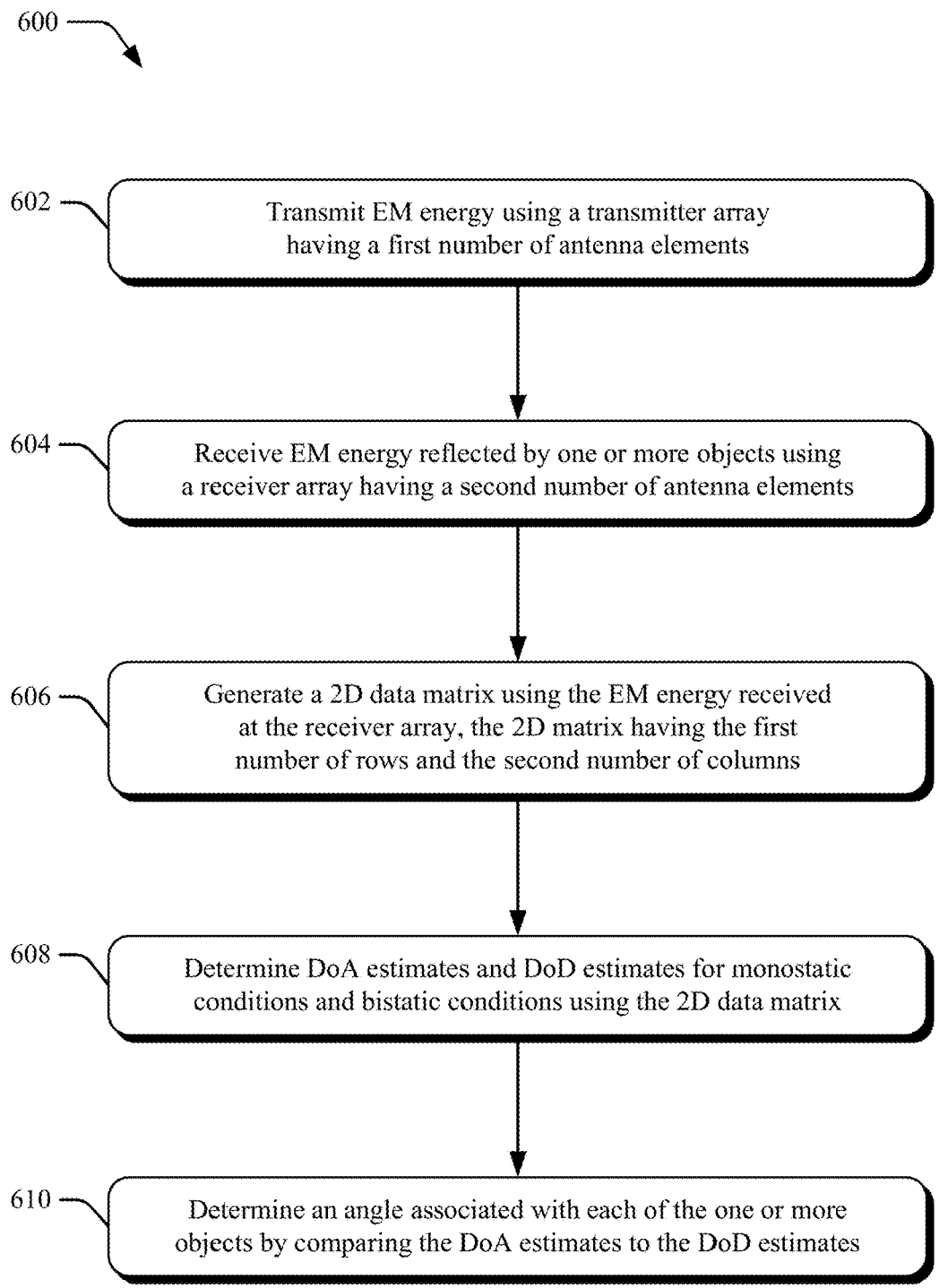
FIG. 6 illustrates an example method of a radar system to detect angles in bistatic and monostatic scenarios.

FIG. 6 illustrates an example method 600 of the radar system 102 to detect angles in bistatic scenarios. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities.

At 602, a radar system transmits EM energy using a transmitter array having a first number of antenna elements. For example, the transmitter array 312 of the antenna 300-2 includes three antenna elements 306. The antenna elements 306 are spaced apart by the transmitter spacing, $d_T$, 316.

At 604, the radar system receives EM energy reflected by one or more objects using a receiver array having a second number of antenna elements. For example, the receiver array 314 of the antenna 300-2 includes four antenna elements 306. The antenna elements 306 are spaced apart by the receiver spacing, $d_R$, 318. The EM energy transmitted by the transmitter array 312 can be reflected by one or more objects 120.

At 606, the radar system generates a 2D data matrix using the EM energy received at the receiver array. The 2D data matrix includes the first number of rows and the second number of columns. For example, the angle-finding module 114 can use the EM energy received at the receiver array 314 to generate the 2D data matrix 500. The 2D data matrix 500 can include three rows and four columns corresponding to the number of antenna elements in the transmitter array 312 and the receiver array 314, respectively.

At 608, the radar system determines DoA estimates and DoD estimates for monostatic conditions and bistatic conditions using the 2D data matrix. For example, the angle-finding module 114 can use the 2D data matrix to perform a direct-matching method or a cross-matching method to determine DoA estimates and DoD estimates for monostatic conditions and/or bistatic conditions as explained in greater detail with respect to FIGS. 4 and 5.

At 610, the radar system determines an angle associated with each of the one or more objects by comparing the DoA estimates to the DoD estimates. For example, the angle-finding module 114 can compare the DoA estimates to the DoD estimates to determine an azimuth or elevation angle for the one or more objects that reflected the EM energy.

EXAMPLES

In the following section, examples are provided.

Example 1: A radar system comprising: a transmitter array configured to transmit electromagnetic (EM) energy, the transmitter array having a first number of antenna elements; a receiver array configured to receive EM energy reflected by one or more objects, the receiver array having a second number of antenna elements; and one or more processors configured to: generate, using the EM energy received at the receiver array, a two-dimensional (2D) data matrix, the 2D data matrix having the first number of rows and the second number of columns; determine, using the 2D data matrix, direction-of-arrival (DoA) estimates and direction-of-departure (DoD) estimates for monostatic conditions and bistatic conditions; and determine, by comparing the DoA estimates to the DoD estimates, an angle associated with each of the one or more objects.

Example 2: The radar system of example 1, wherein the transmitter array comprises a uniform linear array with the first number of antenna elements spaced apart by a first distance.

Example 3: The radar system of example 2, wherein the receiver array comprises another uniform linear array with the second number of antenna elements spaced apart by a second distance.

Example 4: The radar system of example 3, wherein the first distance and the second distance are a first multiple and a second multiple, respectively, of one half a wavelength of the EM energy transmitted by the transmitter array.

Example 5: The radar system of example 4, wherein: the first multiple or the second multiple is equal to one; or the first multiple and the second multiple are coprime.

Example 6: The radar system of example 3, wherein: a horizontal dimension of the 2D data matrix measures a DoA angular phase using the second distance; and a vertical dimension of the 2D data matrix measure a DoD angular phase using the first distance.

Example 7: The radar system of example 1, wherein the one or more processors are configured to determine the DoA estimates and the DoD estimates using at least one of a 2D unitary Estimation of Signal Parameters via Rotational Invariance Technique (ESPRIT), a 2D Multiple Signal Classification (MUSIC), or a two-dimensional fast Fourier transform (FFT) beamforming based-function.

Example 8: The radar system of example 3, wherein the one or more processors are configured to determine the DoD estimates and the DoA estimates as a function of a corresponding angular phase, a wavelength of the EM energy transmitted by the transmitter array, and the first multiple or the second multiple, respectively.

Example 9: The radar system of example 1, wherein the one or more processors are further configured to: determine a number of the one or more objects that reflected the EM energy; responsive to the number of the one or more objects being one or three, use a direct-matching method to determine the angle associated with each of the one or more objects, the direct-matching method determining a matching angle among the DoA estimates that matches or approximately matches another angle among the DoD estimates; and responsive to the number of the one or more objects being two: use the direct-matching method and a cross-matching method to determine a respective potential angle associated with each of the one or more objects, the cross-matching method determining a potential pair of matching angles among the DoA estimates and the DoD estimates; determine a matching error associated with the potential angle and the potential pair of matching angles; and determine the angle associated with each of the one or more objects based on the matching error associated with the potential angle and the potential pair of matching angles.

Example 10: The radar system of example 9, wherein the one or more processors are further configured to, responsive to the number of the one or more objects being two: determine whether the matching error associated with the potential pair of matching angles is less than the matching error associated with the potential angle; responsive to the matching error associated with the potential pair of matching angles being less than the matching error associated with the potential angle, determine that the angle associated with each of the one or more objects is equal to the potential pair of matching angles; and responsive to the matching error associated with the potential pair of matching angles not being less than the matching error associated with the potential angle, determine that the angle associated with each of the one or more objects is equal to the potential angle.

Example 11: The radar system of example 1, wherein the transmitter array and the receiver array are positioned in at least one of an azimuth direction or an elevation direction.

Example 12: The radar system of example 1, wherein the radar system is configured to be installed on an automobile.

Example 13: A computer-readable storage media comprising computer-executable instructions that, when executed, cause a processor of a radar system to: transmit, through a transmitter array of a radar system, electromagnetic (EM) energy, the transmitter array having a first number of antenna elements; receive, from a receiver array of the radar system, EM energy reflected by one or more objects, the receiver array having a second number of antenna elements; generate, based on the EM energy received at the receiver array, a two-dimensional (2D) data matrix, the 2D data matrix having the first number of rows and the second number of columns; determine, based on the 2D data matrix, direction-of-arrival (DoA) estimates and direction-of-departure (DoD) estimates for monostatic conditions and bistatic conditions; and determine, by comparing the DoA estimates to the DoD estimates, an angle associated with each of the one or more objects.

Example 14: The computer-readable storage media of example 13, wherein: the transmitter array comprises a uniform linear array with the first number of antenna elements spaced apart by a first distance; and the receiver array comprises another uniform linear array with the second number of antenna elements spaced apart by a second distance.

Example 15: The computer-readable storage media of example 14, wherein: the first distance and the second distance are a first multiple and a second multiple, respectively, of one half a wavelength of the EM energy transmitted by the transmitter array; and the first multiple or the second multiple is equal to one or the first multiple and the second multiple are coprime.

Example 16: The computer-readable storage media of example 14, wherein: a horizontal dimension of the 2D data matrix measures a DoA angular phase using the second distance; and a vertical dimension of the 2D data matrix measure a DoD angular phase using the first distance.

Example 17: The computer-readable storage media of example 13, wherein the instructions, when executed, further cause the processor of the radar system to determine the DoD estimates and the DoA estimates as a function of a corresponding angular phase, a wavelength of the EM energy transmitted by the transmitter array, and the first multiple or the second multiple, respectively.

Example 18: The computer-readable storage media of example 13, wherein the instructions, when executed, further cause the processor of the radar system to: determine a number of the one or more objects that reflected the EM energy; responsive to the number of the one or more objects being one or three, use a direct-matching method to determine the angle associated with each of the one or more objects, the direct-matching method determining a matching angle among the DoA estimates that matches or approximately matches another angle among the DoD estimates; and responsive to the number of the one or more objects being two: use the direct-matching method and a cross-matching method to determine a respective potential angle associated with each of the one or more objects, the cross-matching method determining a potential pair of matching angles among the DoA estimates and the DoD estimates; determine a matching error associated with the potential angle and the potential pair of matching angles; and determine the angle associated with each of the one or more objects based on the matching error associated with the potential angle and the potential pair of matching angles.

Example 19: The computer-readable storage media of example 18, wherein the instructions, when executed, further cause the processor of the radar system to: determine whether the matching error associated with the potential pair of matching angles is less than the matching error associated with the potential angle; responsive to the matching error associated with the potential pair of matching angles being less than the matching error associated with the potential angle, determine that the angle associated with each of the one or more objects is equal to the potential pair of matching angles; and responsive to the matching error associated with the potential pair of matching angles not being less than the matching error associated with the potential angle, determine that the angle associated with each of the one or more objects is equal to the potential angle.

Example 20: A method comprising: transmitting, through a transmitter array of a radar system, electromagnetic (EM) energy, the transmitter array having a first number of antenna elements; receiving, from a receiver array of the radar system, EM energy reflected by one or more objects, the receiver array having a second number of antenna elements; generating, based on the EM energy received at the receiver array, a two-dimensional (2D) data matrix, the 2D data matrix having the first number of rows and the second number of columns; determining, based on the 2D data matrix, direction-of-arrival (DoA) estimates and direction-of-departure (DoD) estimates for monostatic conditions and bistatic conditions; and determining, by comparing the DoA estimates to the DoD estimates, an angle associated with each of the one or more objects.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:
a transmitter array configured to transmit electromagnetic (EM) energy, the transmitter array having a first number of antenna elements;
a receiver array configured to receive EM energy reflected by one or more objects, the receiver array having a second number of antenna elements, the receiver array and the transmitter array being co-located; and
one or more processors configured to:
generate, using the EM energy received at the receiver array, a two-dimensional (2D) data matrix, the 2D data matrix having the first number of rows and the second number of columns, the first number of rows corresponding to the first number of antenna elements of the transmitter array, the second number of columns corresponding to the second number of antenna elements of the receiver array;

determine, using the 2D data matrix, direction-of-arrival (DoA) estimates and direction-of-departure (DoD) estimates for the one or more objects;

determine a quantity of the one or more objects that reflected the EM energy;

responsive to the quantity of the one or more objects being one or three, determine a monostatic detection condition exists and use, for each of the one or three objects, a direct-matching method to determine a respective angle associated with each of the one or three objects, the direct-matching method determining a matching angle among the DoA estimates that matches or approximately matches another angle among the DoD estimates, the monostatic detection condition corresponding to a DoA estimate being approximately equal to a DoD estimate; and responsive to the quantity of the one or more objects being two:

determine a potential monostatic detection condition or a potential bistatic detection condition exists, the potential bistatic detection condition corresponding to a DoA estimate not being approximately equal to a DoD estimate;

for the potential monostatic detection condition, use, for each of the two objects, the direct-matching method to determine a respective potential angle associated with each of the two objects, the respective potential angle matching a first DoA estimate for a first object of the two objects to a first DoD estimate for the first object and a second DoA estimate for a second object of the two objects to a second DoD estimate of the second object, respectively;

for the potential bistatic detection condition, use, for each of the two objects, a cross-matching method to determine another respective potential angle associated with each of the two objects, the other respective potential angle of the cross-matching method matching the first DoA estimate for the first object to the second DoD estimate for the second object and the second DoA estimate for the first object to the first DoD estimate for the second object, respectively;

determine a matching error associated with potential angle pairs determined using the direct-matching method and another matching error associated with other potential angle pairs determined using the cross-matching method; and responsive to the matching error associated with the direct-matching method being less than the other matching error associated with the cross-matching method, determine the monostatic detection condition exists and output each angle of the respective potential angle pairs as an angle associated with a respective object of the two objects; or responsive to the matching error associated with the direct-responsive to the matching error associated with the direct-matching method not being less than the other matching error associated with the cross-matching method, determine a bistatic detection condition exists and output each angle of the other respective potential angle pairs as the angle associated with the respective object of the two objects.

2. The radar system of claim 1, wherein the transmitter array comprises a uniform linear array with the first number of antenna elements spaced apart by a first distance.

3. The radar system of claim 2, wherein the receiver array comprises another uniform linear array with the second number of antenna elements spaced apart by a second distance.

4. The radar system of claim 3, wherein the first distance and the second distance are a first multiple and a second multiple, respectively, of one half a wavelength of the EM energy transmitted by the transmitter array.

5. The radar system of claim 4, wherein:
the first multiple or the second multiple is equal to one; or
the first multiple and the second multiple are coprime.

6. The radar system of claim 3, wherein:
a horizontal dimension of the 2D data matrix measures a DoA angular phase using the second distance; and
a vertical dimension of the 2D data matrix measure a DoD angular phase using the first distance.

7. The radar system of claim 3, wherein the one or more processors are configured to determine the DoD estimates and the DoA estimates as a function of a corresponding angular phase, a wavelength of the EM energy transmitted by the transmitter array, and the first multiple or the second multiple, respectively.

8. The radar system of claim 1, wherein the one or more processors are configured to determine the DoA estimates and the DoD estimates using at least one of a 2D unitary Estimation of Signal Parameters via Rotational Invariance Technique (ESPRIT), a 2D Multiple Signal Classification (MUSIC), or a two-dimensional fast Fourier transform (FFT) beamforming based-function.

9. The radar system of claim 1, wherein the one or more processors are further configured to, responsive to the quantity of the one or more objects being two and after determining the matching error associated with the direct-matching method and the other matching error associated with the cross-matching method:

determine whether the matching error associated with the direct-matching method is less than a predetermined threshold; and responsive to the matching error associated with the direct-matching method being less than the predetermined threshold, determine the monostatic detection condition exists and output each angle of the respective potential angle pairs as the angle associated with the respective object of the two objects; or responsive to the matching error associated with the direct-matching method not being less than the predetermined threshold, compare the matching error associated with the direct-matching method to the other matching error associated with the cross-matching method.

10. The radar system of claim 1, wherein the transmitter array and the receiver array are positioned in at least one of an azimuth direction or an elevation direction.

11. The radar system of claim 1, wherein the radar system is configured to be installed on an automobile.

12. Non-transitory computer-readable storage media comprising computer-executable instructions that, when executed, cause a processor of a radar system to:

transmit, through a transmitter array of a radar system, electromagnetic (EM) energy, the transmitter array having a first number of antenna elements;

receive, from a receiver array of the radar system, EM energy reflected by one or more objects, the receiver array having a second number of antenna elements, the receiver array and the transmitter array being co-located;

generate, based on the EM energy received at the receiver array, a two-dimensional (2D) data matrix, the 2D data matrix having the first number of rows and the second number of columns, the first number of rows corresponding to the first number of antenna elements of the transmitter array, the second number of columns corresponding to the second number of antenna elements of the receiver array;

determine, based on the 2D data matrix, direction-of-arrival (DoA) estimates and direction-of-departure (DoD) estimates for the one or more objects;

determine a quantity of the one or more objects that reflected the EM energy;

responsive to the quantity of the one or more objects being one or three, determine a monostatic detection condition exists and use, for each of the one or three objects, a direct-matching method to determine a respective angle associated with each of the one or three objects, the direct-matching method determining a matching angle among the DoA estimates that matches or approximately matches another angle among the DoD estimates, the monostatic detection condition corresponding to a DoA estimate being approximately equal to a DoD estimate; and responsive to the quantity of the one or more objects being two:
  determine a potential monostatic detection condition or a potential bistatic detection condition exists, the potential bistatic detection condition corresponding to a DoA estimate not being approximately equal to a DoD estimate;
  for the potential monostatic detection condition, use, for each of the two objects, the direct-matching method to determine a respective potential angle associated with each of the two objects, the respective potential angle matching a first DoA estimate for a first object of the two objects to a first DoD estimate for the first object and a second DoA estimate for a second object of the two objects to a second DoD estimate of the second object, respectively;
  for the potential bistatic detection condition, use, for each of the two objects, a cross-matching method to determine another respective potential angle associated with each of the two objects, the other respective potential angle of the cross-matching method matching the first DoA estimate for the first object to the second DoD estimate for the second object and the second DoA estimate for the first object to the first DoD estimate for the second object, respectively;
  determine a matching error associated with potential angle pairs determined using the direct-matching method and another matching error associated with other potential angle pairs determined using the cross-matching method; and
  responsive to the matching error associated with the direct-matching method being less than the other matching error associated with the cross-matching method, determine the monostatic detection condition exists and output each angle of the respective potential angle pairs as an angle associated with a respective object of the two objects; or
  responsive to the matching error associated with the direct-matching method not being less than the other matching error associated with the cross-matching method, determine a bistatic detection condition exists and output each angle of the other respective potential angle pairs as the angle associated with the respective object of the two objects.

13. The non-transitory computer-readable storage media of claim 12, wherein in the radar system: the transmitter array comprises a uniform linear array with the first number of antenna elements spaced apart by a first distance; and the receiver array comprises another uniform linear array with the second number of antenna elements spaced apart by a second distance.

14. The non-transitory computer-readable storage media of claim 13, wherein in the radar system: the first distance and the second distance are a first multiple and a second multiple, respectively, of one half a wavelength of the EM energy transmitted by the transmitter array; and the first multiple or the second multiple is equal to one or the first multiple and the second multiple are coprime.

15. The non-transitory computer-readable storage media of claim 13, wherein when the instructions are executed, the processor generates the 2D data matrix with: a horizontal dimension of the 2D data matrix measuring a DoA angular phase using the second distance; and a vertical dimension of the 2D data matrix measuring a DoD angular phase using the first distance.

16. The non-transitory computer-readable storage media of claim 12, wherein the instructions, when executed, further cause the processor of the radar system to determine the DoD estimates and the DoA estimates as a function of a corresponding angular phase, a wavelength of the EM energy transmitted by the transmitter array, and the first multiple or the second multiple, respectively.

17. The non-transitory computer-readable storage media of claim 12, wherein the instructions, when executed, further cause the processor of the radar system, responsive to the quantity of the one or more objects being two and after a determination of the matching error associated with the direct-matching method and the other matching error associated with the cross-matching method, to: determine whether the matching error associated with the direct-matching method is less than a predetermined threshold; and responsive to the matching error associated with the direct-matching method being less than the predetermined threshold, determine the monostatic detection condition exists and output each angle of the respective potential angle pairs as the angle associated with the respective object of the two objects; or responsive to the matching error associated with the direct-matching method not being less than the predetermined threshold, compare the matching error associated with the direct-matching method to the other matching error associated with the cross-matching method.

18. The non-transitory computer-readable storage media of claim 12, wherein in the radar system the transmitter array and the receiver array are positioned in at least one of an azimuth direction or an elevation direction.

19. The non-transitory computer-readable storage media of claim 12, wherein when the instructions are executed, the processor determines the DoA estimates and the DoD estimates using at least one of a 2D unitary Estimation of Signal Parameters via Rotational Invariance Technique (ESPRIT), a 2D Multiple Signal Classification (MUSIC), or a two-dimensional fast Fourier transform (FFT) beamforming based-function.

20. A method comprising:
  transmitting, through a transmitter array of a radar system, electromagnetic (EM) energy, the transmitter array having a first number of antenna elements;

receiving, from a receiver array of the radar system, EM energy reflected by one or more objects, the receiver array having a second number of antenna elements, the receiver array and the transmitter array being co-located;

generating, based on the EM energy received at the receiver array, a two-dimensional (2D) data matrix, the 2D data matrix having the first number of rows and the second number of columns, the first number of rows corresponding to the first number of antenna elements of the transmitter array, the second number of columns corresponding to the second number of antenna elements of the receiver array;

determining, based on the 2D data matrix, direction-of-arrival (DoA) estimates and direction-of-departure (DoD) estimates for the one or more objects;

determining a quantity of the one or more objects that reflected the EM energy;

responsive to the quantity of the one or more objects being one or three, determining a monostatic detection condition exists and using, for each of the one or three objects, a direct-matching method to determine a respective angle associated with each of the one or three objects, the direct-matching method determining a matching angle among the DoA estimates that matches or approximately matches another angle among the DoD estimates, the monostatic detection condition corresponding to a DoA estimate being approximately equal to a DoD estimate; and responsive to the quantity of the one or more objects being two:

determining a potential monostatic detection condition or a potential bistatic detection condition exists, the potential bistatic detection condition corresponding to a DoA estimate not being approximately equal to a DoD estimate;

for the potential monostatic detection condition, using, for each of the two objects, the direct-matching method to determine a respective potential angle associated with each of the two objects, the respective potential angle matching a first DoA estimate for a first object of the two objects to a first DoD estimate for the first object and a second DoA estimate for a second object of the two objects to a second DoD estimate of the second object, respectively;

for the potential bistatic detection condition, using, for each of the two objects, a cross-matching method to determine another respective potential angle associated with each of the two objects, the other respective potential angle of the cross-matching method matching the first DoA estimate for the first object to the second DoD estimate for the second object and the second DoA estimate for the first object to the first DoD estimate for the second object, respectively;

determining a matching error associated with potential angle pairs determined using the direct-matching method and another matching error associated with other potential angle pairs determined using the cross-matching method; and responsive to the matching error associated with the direct-matching method being less than the other matching error associated with the cross-matching method, determining the monostatic detection condition exists and outputting each angle of the respective potential angle pairs as an angle associated with a respective object of the two objects; or responsive to the matching error associated with the direct-matching method not being less than the other matching error associated with the cross-matching method, determining a bistatic detection condition exists and outputting each angle of the other respective potential angle pairs as the angle associated with the respective object of the two objects.

* * * * *

UNITED STATES PATENT AND TRADEMARK OFFICE
CERTIFICATE OF CORRECTION

PATENT NO. : 11,714,180 B2
APPLICATION NO. : 17/318621
DATED : August 1, 2023
INVENTOR(S) : Yu Zhang, Zhengzheng Li and Xin Zhang It is certified that error appears in the above-identified patent and that said Letters Patent is hereby corrected as shown below:

In the Claims

Column 17, Lines 57 and 58 Claim 2 after "direct-" before "matching" delete "responsive to the matching error associated with the direct-"

Signed and Sealed this
Fifth Day of September, 2023

Katherine Kelly Vidal
*Director of the United States Patent and Trademark Office*